United States Patent [19]

Neri et al.

[11] Patent Number: 4,957,956
[45] Date of Patent: Sep. 18, 1990

[54] SOLID STABILIZER COMPOSITION FOR ORGANIC POLYMERS, AND PROCESS FOR PREPARING IT

[75] Inventors: Carlo Neri, San Donato Milanese; Nereo Nodari, Spino D'Adda; Erik Bersanetti, Milan; Giovanni Sandre, San Donato Milanese, all of Italy

[73] Assignee: Enichem Synthesis S.p.A., Palermo, Italy

[21] Appl. No.: 154,916

[22] Filed: Feb. 11, 1988

[30] Foreign Application Priority Data

Feb. 13, 1987 [IT] Italy ............................ 19366 A/87
Feb. 13, 1987 [IT] Italy ............................ 19368 A/87

[51] Int. Cl.$^5$ ........................ C08K 5/49; C08K 5/53; C08K 5/513; C08K 5/09
[52] U.S. Cl. ........................ 524/120; 524/126; 524/147; 524/151; 524/291; 523/223; 252/400.24; 252/404
[58] Field of Search ............ 252/400.24, 404; 523/223; 524/120, 126, 147, 151, 291

[56] References Cited

U.S. PATENT DOCUMENTS 3,984,460 10/1976 Spivack .............................. 524/291
4,187,212 2/1980 Zinke et al. ........................ 524/101
4,360,617 11/1982 Müller et al. ..................... 524/101

FOREIGN PATENT DOCUMENTS 48562 3/1982 European Pat. Off. .
48605 5/1986 European Pat. Off. ............ 524/120
12581 6/1969 Japan ................................ 524/291
5630448 3/1981 Japan ................................ 524/291

Primary Examiner—Kriellion Morgan
Attorney, Agent, or Firm—Hedman, Gibson, Costigan & Hoare

[57] ABSTRACT

A solid stabilizer composition for organic polymers is formed by a solid, continuous phase and by a dispersed phase in said continuous phase, wherein the continuous phase is constituted by amorphous tetrakis-[3-(3,5-di-tert.-butyl-4-hydroxyphenyl)-propionyloxymethyl]-methane and the dispersed phase is constituted by an either amorphous or crystalline organic phosphite, in the form of particles with a particle size of from 10 μm to 2 mm, with the weight ratio of said continuous phase to said dispersed phase being comprised within the range of from 9:1 to 1:9.

The processes for preparing said solid stabilizer composition and its use in the stabilization of organic polymers are disclosed.

18 Claims, No Drawings

SOLID STABILIZER COMPOSITION FOR ORGANIC POLYMERS, AND PROCESS FOR PREPARING IT

The present invention relates to a solid composition stabilizer for organic polymers, to the processes for preparing it and to its use in the stabilization of the organic polymers.

The organic phosphites and the sterically hindered phenols are known compounds, used in the art, also in combination with one another, in order to stabilize the organic polymers against the oxidative degradation caused by light and heat, such as disclosed, e.g. in U.S. Pat. Nos. 4,187,212 and 4,360,617.

In the use of mixtures of sterically hindered phenols and of organic phosphites, in the stabilization of the organic polymers, difficulties exist in accomplishing a complete homogenization between the two stabilizers, and then between these and the organic polymer. It derives therefrom that often the stabilizing effect shown does not reach the maximum possible level.

The present Applicant has found now that when certain organic phosphites are introduced as a dispersed solid phase in a continuous and amorphous phase of tetrakis-[3-(3,5-di-tert.-butyl-4-hydroxyphenyl)-propionyl-oxymethyl]methane, a stabilizer composition is obtained, which can be easily homogenized with the organic polymers, and is capable of giving the same polymers excellent characteristics of stability against the degradative action caused by light and heat.

However, a drawback shown by the organic phosphites is their tendency to hydrolyse, in particular during the storage in a warm and moist environment, with the consequent loss of stabilizer activity, and danger of corrosion of the equipment used for processing the organic polymers incorporating said hydrolysed phosphites.

Therefore, it is common in the art to stabilize the organic phosphites by means of the addition of such organic bases, as: hexamethylenetetramine, triisopropanolamine and still others, which act by buffering the acidity which is released during the hydrolysis, and hence slow down the hydrolysis rate.

However, this operating way does not make it possible satisfactory results to be obtained, in particular in case of phosphites deriving from pentaerythritol, whose sensitivity to hydrolysis remains high event in the presence of an organic base.

On the other side, in the use of mixtures of sterically hindered phenols and of organic phosphites in the stabilization of the organic polymers, difficulties exist in accomplishing a complete homogenization between the two stabilizers, and then between these and the organic polymer. Often, this fact, combined with the phenomena of hydrolysis the phosphite is subject to, does not allow a so high as desirable stabilizing effect to be obtained.

In U.S. patent application No. 074.561 filed on July 17,1987, now Pat. No. 4,886,900, a particular tetrakis-3-(3-,5-di-tert.-butyl-4-hydroxyphenyl)-propionyloxymethyl]methane is disclosed, which has an amorphous structure and a glass transition temperature Tg of from approximately 40° C. to 50° C., and does not show endothermic melting peaks at temperatures higher than 50° C. up to 200° C. This amorphous compound is obtained, according to said patent application by means of a sharp cooling of the relevant molten material.

The present Applicant has found also that, when certain organic phosphites are introduced as a dispersed solid phase in a continuous and amorphous phase of tetrakis-[3-(3,5-di-tert.-butyl-4-hydroxyphenyl)-propionyl-oxymethyl]methane, a few of said phosphites get endowed with exceptionally high characteristics of resistance to hydrolysis.

In order to overcome the drawbacks of the prior art compositions as outlined above, an objective of the invention is to prepare a novel stabilizing composition for organic polymers.

Another objective of the invention is to provide processes for preparing such stabilizing compositions.

Another aspect of the invention is the use of the composition in question for stabilizing organic polymers.

According to the invention, the stabilizing compositions for organic polymers, are composed of a solid continuous phase and another solid continuous phase dispersed in the former, characterized in that said former continuous phase consists of amorphous tetrakis-3-(3,5-di-tert.-butyl-4-hydroxyphenyl)propionyl-oxymethyl]methane, and the dispersed phase is selected from among:

(a) an either amorphous or crystalline organic phosphite, in the form of particles with a particle size comprised within the range of from 10 /μm to 2 mm, with said organic phosphite having a melting point higher than the melting point of said tetrakis-3-(-3,5-di-tert.-butyl-4-hydroxyphenyl)propionyl-oxymethyl]methane, and being selected from those definable by the general formula:

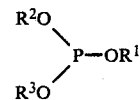

wherein: $R^1$, $R^2$ and $R^3$ represent either equal or different hydrocarbyl radicals, which can be either alkyl, cycloalkyl, aryl, alkaryl or aralkyl radicals;
the weight ratio of said continuous phase to said dispersed phase, in said composition, being furthermore comprised within the range of from 9:1 to 1:9, or (b) an either amorphous or crystalline organic phosphite, in the form of particles with a particle size comprised within the range of from 50 /μm to 2 mm, with said organic phosphite having a melting point higher than approximately 100° C., and being selected from those definable by the general formulae:

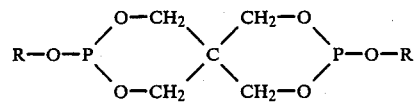

and

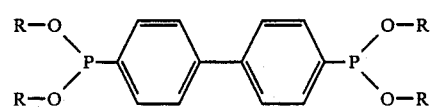

wherein: the R radicals independently represent either alkyl, cycloalkyl, aryl, alkaryl or aralkyl radicals;

the weight ratio of said continuous phase to said dispersed phase, in said composition, being furthermore comprised within the range of from 9:1 to 1:9.

Tetrakis-[3-(3,5-di-tert.-butyl-4-hydroxyphenyl)-propionyloxy-methyl]methane is a compound having the formula:

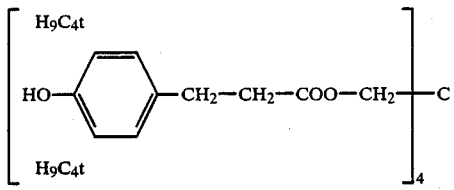

and is used in the art in the stabilization of the organic polymers, such as disclosed, e.g., in U.S. Pat. No. 3,644,428.

The melting point of this compound varies as a function of its purity level, and of its either amorphous or crystalline state, and is generally comprised within the range of from 40° C. to 136° C.

Specific examples of organic phosphites of the (a) class which can be used in the compositions according to the present invention are: diphenyl 2-ethylhexyl phosphite, triphenyl phosphite, tris(2,5-di-tert.-butylphenyl)phosphite, tris(2-tert.-butylphenyl)phosphite, tris(2-phenylphenyl)phosphite, tris[2-(1,1-dimethylpropyl)phenyl)phosphite, tris(2-cyclohexylphenyl)phosphite, tris(2-tert.-butyl-4-phenylphenyl)phosphite, tris(2-tert.-butyl-4-methylphenyl)phosphite, tris(2,4-di-tert.-amylphenyl)phosphite and tris(2,4-di-tert.-butylphenyl)phosphite.

In a preferred form of practical embodiment, the organic phosphite has a melting point higher than 100° C., and is present in the composition in the form of particles having a particle size of the order of from 100 to 500 μm, and the weight ratio of the continuous phase to the dispersed phase in the composition is comprised within the range of from 3:7 to 7:3.

Solid compositions according to the present invention can be prepared by means of different processes, according to whether one desires to have the organic phosphite in the amorphous form, or in the crystalline form in the composition.

In the first case, tetrakis-[3-(3,5-di-tert.-butyl-4-hydroxyphenyl)-propionyl-oxy-methyl]methane powder and the powder of the selected organic phosphite are mixed with each other. By operating under nitrogen, or under another inert gas, the mass is molten to a temperature which is typically of the order of from 160° to 170° C., the mass is homogenized and is then submitted to a sudden cooling down to temperature values equal to room temperature (20°–25° C.), or close to room temperature.

In the second case, the molten mass is first slowly cooled (e.g., with a cooling rate of the order of 10° C./hour), down to a temperature of the order of 80°–100° C. in order to make the organic phosphite solidify in the crystalline form. The mass is then rapidly cooled down to temperature values equal to room temperature, or close to room temperature, in order to make tetrakis-[3-(3,5-di-tert.-butyl-4-hydroxyphenyl)-propionyl-oxy-methyl]methane solidify in the amorphous form.

According to another form of practical embodiment, amorphous tetrakis-[3-(3,5-di-tert.-butyl-4-hydroxyphenyl)-propionyl-oxy-methyl]methane is molten, by operating under nitrogen, or under another inert gas, at a temperature which typically is of the order of from 80° to 100° C., and anyway at a temperature lower than the melting temperature of the selected organic phosphite. Into the molten mass, the solid and crystalline organic phosphite is introduced, in the form of particles with a particle size which preferably is of the order of from 100 to 500 μm. After the solid being homogenized with the molten material, the whole mass is sharply cooled down to temperature values equal to room temperature, or close to it.

The sharp cooling, suitable for causing the molten material, or the molten fraction, to rapidly solidify, can be attained by any methods known in the art. The preferred methods consist in pouring the molten material on a cool metal plate, maintained, e.g., at a temperature equal to, or lower than, room temperature; in pouring the molten mass into water, or another non-reactive, cold liquid, e.g., maintained at a temperature equal to, or lower than, room temperature; and in cooling the molten, or partially molten, material in an inert gas (e.g., nitrogen), in the form of droplets, by means of a technique similar to prilling.

In any case, a stabilizer composition resistant to hydrolysis is obtained, wherein the organic phosphite is in the form of a solid phase, as particles having a particle size comprised within such range of values as above specified, with said particles being dispersed inside a continuous and amorphous solid phase of tetrakis-[3-(3,5-di-tert.-butyl-4-hydroxyphenyl)-propionyl-oxymethyl]methane.

Furthermore, the above disclosed processes make possible a solid composition to be prepared as a mass which can be submitted to scaling and/or to grinding, or as free-flowing granules, having the desired particle size, which can be directly used in the stabilization of the organic polymers.

The solid compositions of the present invention show the following general characteristics, when tested by DSC; HPLC analysis; and X-ray diffraction (RX).

The product obtained by means of a rapid cooling have a glass-like, clear appearance, and can be easily turned into a powder by grinding.

By means of powder X-ray diffraction spectra, the absence is observed of the peaks relating to the components, and a spectrum is obtained, which is constituted by some wide bands. The gas-chromatographic and/or HPLC analysis run on the solutions of the mixtures in chloroform or in methylene chloride shows the presence of the two constituents of the mixture, with no further peaks appearing; that confirms that the treatment they underwent does not alter their respective chemical nature.

The analysis by fast-scanning DSC (Differential thermal analysis) shows a slight glass transition (Tg) at approximately 40°–50° C., relevant to the phenolic component, and no further either endothermic or exothermic transitions up to 250° C. In mixtures containing more than 30% of phosphite, if DSC analysis is run in slow-scanning mode (1° C./minute), the release is observed of exothermal heat at a temperature comprised within the range of from 100° to 120° C., relevant to the crystallization of a portion of phosphite in the molten amorphous phenolic material, and, subsequently, the absorption of endothermal heat (with the same enthalpy value, as Joules/gram) is observed in correspondence of the melting temperature of the same phosphite.

On the contrary, the products obtained by slow cooling show, at RX, the spectrum of lines of phosphite overlapped to the wide bands of the amorphous phenol.

In this case too, the gas-chromatographic analysis and/or HPLC analysis do not show any chemical changes in the components of the mixture.

The analysis by DSC, at any scanning speeds, shows always a glass transition around 40°-50° C., and an endothermic peak in correspondence of the melting temperature of the phosphite.

In the following Examples, the following compounds were used:

ANOX(R) 20—tetrakis-[3-(3,5-di-tert.-butyl-4-hydroxy-phenyl)-propionyl-oxy-methyl]-methane; a commercial product ALKANOX(R) 240—tris(2,5-di-tert.-butylphenyl)-phosphite; a commercial product Tris(2,4-diisoamylphenyl)phosphite.

EXAMPLES 1 TO 6

100 Grams are prepared of the mixtures of the phenolic antioxidant and of the phosphite, in the ratios shown in Table 1, expressed as percentages by weight:

TABLE 1

| Mixture | ANOX 20 | ALKANOX 240 | Tris(2,4-diisoamyl-phenyl)phosphite |
|---|---|---|---|
| 1 | 10 | 90 | — |
| 2 | 50 | 50 | — |
| 3 | 90 | 10 | — |
| 4 | 10 | — | 90 |
| 5 | 50 | — | 50 |
| 6 | 90 | — | 10 |

All the mixtures are charged to a same number of glass test tubes, and these are dipped in an oil bath at 190° C., with stirring and under nitrogen, until clear solutions are obtained. At this time point, the mixture are rapidly poured on aluminum trays of 20×20 cm, and are let cool. Glass-like, hard slabs are obtained, which can be easily ground in a mortar.

The so obtained samples are submitted to the above said analyses (HPLC, DSC, RX).

EXAMPLES 7 TO 12

These examples are run according to the same procedure as described in Examples 1 to 6, but when the mixtures are molten and clear, they are slowly cooled down to approximately 100°-120° C.; at this temperature, the phosphites start to crystallize. The temperature of 100° C. is maintained until the mixtures have the appearance of viscous masses, made opaque by the presence of small phosphite crystals. At this time point, the suspensions are poured on aluminum plates, at room temperature, and and let cool in air. Glass-like, opaque, slabs are obtained, which can be ground to a powder. The so obtained samples are submitted to the above said analysis (HPLC, DSC, RX). The composition of the mixtures is the same of the examples of Table 1, but they are given the numbers from 7 to 12.

EXAMPLES 8 TO 19

The powders obtained by grinding the above mixtures undergo the hydrolysis tests, which are carried out as follows:

10 g of each sample and 10 g of mechanical mixtures of antioxidant/phosphite in the same proportions as of Table 1 are weighed; the samples are charged to an equal number of aluminum dishes of 5 cm of diameter, and the so-prepared dishes are charged to an oven kept at the controlled temperature of 40° C., and containing, on its floor, a tray filled with water; a hygrometer located inside the oven shows a humidity rate of 85%.

The samples are removed from the oven after 200 hours, and are suspended in 100 cc of hexane; the clear hexanic solution is submitted to gas-chromatographic analysis, in order to detect 2,4-diisoamylphenol (in the tests containing the corresponding phosphite) and 2,4-di-tert.-butylphenol (in the tests containing Alkanox 240).

The hydrolysis percentage is expressed as the released amount of 2,4-diisoamylphenol (or of 2,4-di-tert.-butylphenol), relatively to the amount which would be obtained, should the phosphite be completely hydrolyzed.

The results are shown in Table 2, wherein by means of the letters from A to F, the respective mechanical mixtures are indicated:

TABLE 2

| Composition | Hydrolysis % After 200 Hours |
|---|---|
| 1 | 2.5 |
| 2 | 2.3 |
| 3 | 1.8 |
| 4 | 2.7 |
| 5 | 2.0 |
| 6 | 1.8 |
| 7 | 1.5 |
| 8 | 1.3 |
| 9 | 1.3 |
| 10 | 1.8 |
| 11 | 1.7 |
| 12 | 1.5 |
| A | 6.8 |
| B | 5.9 |
| C | 6.2 |
| D | 7.5 |
| E | 7.2 |
| F | 6.8 |

The mixtures of phenol and phosphites obtained according to the above indicated procedure, are highly efficacious in the stabilization of such polymers and copolymers as polyolefins, EPDM, elastomers, ABS, polymeric alloys, polyesters, polycarbonates, natural rubber, and so forth.

For exemplifying purposes, the following example of polypropylene stabilization is reported.

EXAMPLES 20 AND 21

500 Grams of FLF 20 polypropylene (HIMONT) powder is mixed with 0.5 g of powder of composition No. 5, the mixture is blended for 30 minutes in a planetary mixer, and is then charged to a laboratory Brabender extruder.

The extrusion conditions are:

| | |
|---|---|
| compression ratio | 1:4 |
| screw revolution speed | 50 rpm |
| temperature profile | 190/235/270/270° C. |

The blend is so extruded and granulated seven times under the same conditions, and a sample of 10 g, drawn after each odd-numbered extrusion, is submitted to MFI measurement at 230° C. (2.16 kg), and to the measurement of the Yellow Index (Y.I.) by means of a Macbeth colorimeter.

A portion of the granules obtained from the first extrusion are moulded in an injection-press at 190° C.

and 60 bar, with a slab of 4×4 cm and 1 mm of thickness being obtained.

This slab is charged to a forced air circulation over, at 140° C.; the necessary time for the first degradation symptom (a brittle yellow dust at slab corners) to appear is given the name of "embrittlement time" (E.T.).

The same identical procedure is followed with the phenol/phosphite mechanical mixture denominated "B", with the composition No. 8, and with non-stabilized polypropylene powder; the comparative results are shown in Table 3.

TABLE 3

|  | MFI | | | | Y.I. | E.T. hours |
| --- | --- | --- | --- | --- | --- | --- |
|  | 1 | 3 | 5 | 7 | | |
| PP with no additives | 14.2 | 20 | 35 | — | 8.5 | 80 |
| PP + Composition 2 | 12.1 | 13.7 | 16.8 | 22.8 | 2.8 | 520 |
| PP + Composition 8 | 12.0 | 13.6 | 18.2 | 23.8 | 2.8 | 500 |
| PP + Mixture B | 12.2 | 14.2 | 18.8 | 25.9 | 4.2 | 460 |

Specific examples of organic phosphites of the b) class which can be used in the compositions according to the present invention are: bis(2,4-di-tert.-butylphenyl)pentaerythritol diphosphite, distearyl pentaerythritol diphosphite, and tetrakis(2,4-di-tert.-butylphenyl)-4,4'-biphenylene di-phosphonite.

In a preferred form of this embodiment, the organic phosphite is present in the composition in the form of particles having a particle size of the order of from 100 to 500 μm, and the weight ratio of the continuous phase to the dispersed phase in the composition is comprised within the range of from 3:7 to 7:3.

The solid compositions of this particular aspect of the present invention can be prepared by means of different processes, according to whether one desires to have the organic phosphite in the amorphous form, or in the crystalline form in the composition.

In the first case, tetrakis-[3-(3,5-di-tert -butyl-4-hydroxyphenyl)-propionyl-oxy-methyl]methane powder and the powder of the selected organic phosphite are mixed with each other. By operating under nitrogen, or under another inert gas, the mass is molten to a temperature which typically is of the order of from 160° to 170° C., the mass is homogenized and is then submitted to a sudden cooling down to temperature values equal to room temperature (20°-25° C.), or approximately equal to room temperature.

In the second case, the molten mass is first slowly cooled (e.g., with a cooling rate of the order of 10° C./hour), down to a temperature of the order of 80°-100° C. in order to make the organic phosphite solidify in the crystalline form. The mass is then rapidly cooled down to temperature values equal to room temperature, or approximately equal to room temperature, in order to make tetrakis-[3-(3,5-di-tert.-butyl-4-hydroxyphenyl)-propionyl-oxy-methyl]methane solidify in the amorphous form.

According to another form of practical embodiment, amorphous tetrakis-[3-(3,5-di-tert.-butyl-4-hydroxyphenyl)-propionyl-oxy-methyl]methane is molten, by operating under nitrogen, or under another inert gas, at a temperature which typically is of the order of from 80° to 100° C., and anyway at a temperature lower than the melting temperature of the selected organic phosphite. Into the molten mass, the solid and crystalline organic phosphite is introduced, in the form of particles with a particle size which preferably is of the order of from 100 to 500 μm. After the solid being homogenized with the molten material, the whole mass is sharply cooled down to temperature values equal to room temperature, or approximately equal to it.

The sharp cooling, suitable for causing the molten material, or the molten fraction thereof, to rapidly solidify, can be attained by any methods known in the art. The preferred methods consist in pouring the molten material on a cool metal plate, maintained, e.g., at a temperature equal to, or lower than, room temperature; in pouring the molten mass into water, or another nonreactive, cold liquid, e.g., maintained at a temperature equal to, or lower than, room temperature; and in cooling the molten, or partially molten, material, under an inert gas (e.g., nitrogen), in the form of droplets, by means of a technique similar to prilling.

In any case, a stabilizer composition resistant to hydrolysis is obtained, wherein the organic phosphite is in the form of a solid phase, as particles having a particle size comprised within such range of values as above specified, with said particles being dispersed inside a continuous and amorphous solid phase of tetrakis-[3-(3,5-di-tert.-butyl-4-hydroxyphenyl) -propionyl-oxymethyl]methane.

Furthermore, the above disclosed processes make possible a solid composition to be prepared as a mass which can be submitted to scaling and/or to grinding, or as free-flowing granules, having the desired particle size, which can be directly used in the stabilization of the organic polymers.

The solid compositions of the present invention show the following general characteristics, when tested by DSC; HPLC analysis; and X-ray diffraction (RX).

The products obtained by rapid cooling have a clear glass-like appearance, and can be easily turned into a powder by grinding.

By means of the X-ray diffraction spectra of the powders, the absence is observed of the peaks relating to the components, and a spectrum is obtained, which is constituted by some wide bands. The gas-chromatographic analysis, and/or HPLC analysis run on the solutions of said mixtures in chloroform or in methylene chloride, show the presence of the two constituents of the mixture, with no further peaks being present on the chromatograms; that confirms that the treatment the products underwent does not alter their respective chemical nature.

The analysis by fast-scanning DSC (Differential thermal analysis) shows a slight glass transition (Tg) at approximately 40°-50° C., relevant to the phenolic component, and no further either endothermic or exothermic transitions up to 250° C. In the mixtures containing more than 30% of phosphite, if DSC analysis is run in slow-scanning mode (1° C./minute), an exothermicity is observed at a temperature comprised within the range of from 100° to 120° C., relevant to the crystallization of a portion of phosphite in the molten amorphous phenol, and, subsequently, an endothermicity (with the same enthalpy value, as Joules/gram) is observed in correspondence of the melting temperature of the same phosphite.

On the contrary, the products obtained by slow cooling show, at RX, the spectrum of phosphite lines overlapped to the wide bands of the amorphous phenolic compound.

In this case too, the gas-chromatographic analysis and/or HPLC analysis do not show any chemical changes in the components of the mixture.

The analysis by DSC, at any scanning speeds, shows always a glass transition around 50° C., and an endothermic peak in correspondence of the melting temperature of the phosphite.

In the following experimental Examples, the following compounds were used:

ANOX(R) 20—tetrakis-[3-(3,5-di-tert.-butyl-4-hydroxyphenyl)-propionyl-oxy-methyl]methane; a commercial product.

WESTON(R) 618—distearyl pentaerythrytol diphosphite; a commercial product.

ULTRANOX(R) 626—Bis(2,4-di-tert.-butylphenyl)-pentaerythritol diphosphite; a commercial product

EXAMPLES 22 TO 27

100 Grams are prepared of the mixtures of the phenolic antioxidant and of the phosphite, in such ratios as shown in Table 4, expressed as percentages by weight:

TABLE 4

| Mixture | ANOX 20 | WESTON 618 | ULTRANOX 626 |
|---------|---------|------------|--------------|
| 41 | 10 | 90 | — |
| 42 | 50 | 50 | — |
| 43 | 90 | 10 | — |
| 44 | 10 | — | 90 |
| 45 | 50 | — | 50 |
| 46 | 90 | — | 10 |

All the mixtures are charged to a same number of glass test tubes, and these are dipped in an oil bath at 190° C., with stirring and under nitrogen, until clear solutions are obtained. At this time point, the mixtures are rapidly poured on aluminum trays of 20×20 cm, and are allowed to cool. Hard glass-like slabs are obtained, which can be easily ground in a mortar.

The so obtained samples are submitted to the above specified analyses (HPLC, DSC, RX).

EXAMPLES 28 TO 33

These examples are run according to the same procedure as described in Examples 22 to 27, but when the mixtures are molten and clear, they are slowly cooled down to approximately 100°-120° C.; at this temperature, the phosphites start to crystallize. The temperature of 100° C. is maintained until the mixtures have turned into viscous masses, opaque owing to the presence of small phosphite crystals. At this time point, the suspensions are poured on aluminum plates, at room temperature, and are let cool in air. Glass-like, opaque slabs are obtained, which can be ground to a powder. The so obtained samples are submitted to the above said analyses (HPLC, DSC, RX). The composition of the mixtures is the same as of the examples of Table 4, but they are given the numbers from 7 to 12.

EXAMPLES 29 TO 40

The powders obtained by grinding the above mixtures are submitted to the hydrolysis tests, which are carried out as follows:

10 g of each sample and 10 g of mechanical mixtures of antioxidant/phosphite in the same proportions as of Table 1 are weighed; the samples are charged to an equal number of aluminum dishes of 5 cm of diameter, and the so-prepared dishes are charged to an oven kept at the controlled temperature of 40° C., and containing, on its floor, a tray filled with water; a hygrometer located inside the oven shows a humidity rate of 85%.

The samples are removed from the oven 20 hours later, and are suspended in 100 cc of hexane; the clear hexane solution is submitted to gas-chromatographic analysis, in order to detect stearyl alcohol (in the tests containing distearyl pentaerythritol diphosphite) and 2,4-di-tert.-butylphenol (in the tests containing bis-(2,4-di-tert.-butylphenyl)pentaerythritol diphosphite).

The hydrolysis percentage is expressed as the released amount of stearyl alcohol (or of 2,4-di-tert.-butylphenol), relatively to the amount which would be obtained if the phosphite had undergone a complete hydrolysis.

The results are shown in Table 5, wherein by means of the letters from A to F, the respective mechanical mixtures are indicated:

TABLE 5

| Composition | Hydrolysis % After 20 Hours |
|-------------|------------------------------|
| 51 | 11.5 |
| 52 | 10.6 |
| 53 | 6.8 |
| 54 | 8.5 |
| 55 | 8.2 |
| 56 | 4.8 |
| 57 | 9.0 |
| 58 | 7.7 |
| 59 | 4.2 |
| 60 | 6.5 |
| 61 | 5.8 |
| 62 | 3.6 |
| A | 38.5 |
| B | 36.1 |
| C | 37.2 |
| D | 30.3 |
| E | 28.4 |
| F | 29.7 |

The compositions of phenol and phosphites obtained according to the above detailed procedure, are highly efficacious in the stabilization of such polymers and copolymers as: polyolefins, EPDM, elastomers, ABS, polymeric alloys, polyesters, polycarbonates, natural rubber, and so forth.

For exemplifying purposes, the following example of polypropylene stabilization is reported.

EXAMPLES 41 AND 42

500 Grams of FLF 20 polypropylene (HIMONT) powder is mixed with 0.5 g of powder of composition No. 55, the mixture is blended for 30 minutes in a planetary mixer, and is then charged to a laboratory Brabender extruder.

The extrusion conditions are:

| | |
|---|---|
| compression ratio | 1:4 |
| screw revolution speed | 50 rpm |
| temperature profile | 190/235/270/270° C. |

The blend is then extruded and granulated seven times under the same conditions, and a sample of 10 g, drawn after each odd-numbered extrusion, is submitted to MFI measurement at 230° C. (2.16 kg), and to the measurement of the Yellow Index (Y.I.) by means of a Macbeth colorimeter.

A portion of the granules obtained from the first extrusion are moulded in an injection-press at 190° C. and 60 bar, with a slab of 4×4 cm and 1 mm of thickness being obtained.

This slab is charged to a forced air circulation oven, at 140° C.; the necessary time for the first degradation symptom (a brittle yellow dust at slab corners) to appear is given the name of "embrittlement time" (E.T.).

The same identical procedure is followed with the phenol/phosphite mechanical mixture denominated "E", with composition No. 11, and with non-stabilized polypropylene powder; the comparative results are shown in Table 6.

TABLE 6

|  | MFI | | | | Y.I. | E.T. hrs |
| --- | --- | --- | --- | --- | --- | --- |
|  | 1 | 3 | 5 | 7 | | |
| PP with no additives | 14 | 20 | 35 | — | 8.5 | 80 |
| PP + Composition 5 | 12 | 13.7 | 16 | 19.8 | 1.8 | 570 |
| PP + Composition 11 | 12 | 13.6 | 16.2 | 18.8 | 1.8 | 600 |
| PP + Mixture E | 12 | 14.2 | 17.8 | 21.9 | 2.2 | 480 |

We claim:

1. A stabilizing composition for organic polymers, composed of a solid continuous phase and another solid continuous phase dispersed in the former, characterized in that said former continuous phase consists of amorphous tetrakis-[3-(3,5-di-tert.-butyl-4-hydroxyphenyl)-propionyloxy-methyl]methane, and the dispersed phase is selected from among:

(a) an either amorphous or crystalline organic phosphite, in the form of particles with a particle size comprised within the range of from 10 μm to 2 mm, with said organic phosphite having a melting point higher than the melting point of said tetrakis-[3-(3,5-di-tert.-butyl-4-hydroxyphenyl)-propionyl-oxy-methyl]methane, and being selected from those definable by the general formula:

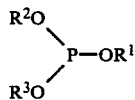

wherein: $R^1$, $R^2$ and $R^3$ represent either equal or different hydrocarbyl radicals, which can be alkyl, cycloalkyl, aryl, alkaryl or aralkyl radicals; the weight ratio of said continuous phase to said dispersed phase, in said composition, being furthermore comprised within the range of from 9:1 to 1:9, or (b) an either amorphous or crystalline organic phosphite, in the form of particles with a particle size comprised within the range of from 50 μm to 2 mm, with said organic phosphite having a melting point higher than approximately 100° C., and being selected from those definable by the general formulae:

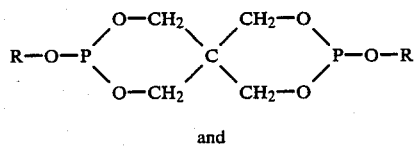

and

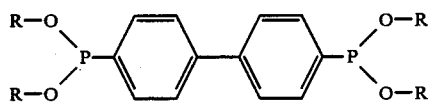

wherein: the R radicals independently represent alkyl, cycloalkyl, aryl, alkaryl or aralkyl radicals; the weight ratio of said continuous phase to said dispersed phase, in said compositions, being furthermore comprised within the range of from 9:1 to 1:9.

2. Composition according to claim 1, characterized in that said dispersed phase is in the form of particles having a particle size comprised within the range of from 50 μm to 2 mm.

3. Composition according to claim 1, characterized in that the size of the particles of said dispersed phase is comprised within the range of from 100 to 500 μm.

4. Composition according to claim 1, characterized in that the weight ratio of said continuous phase to said dispersed phase is comprised within the range of from 3:7 to 7:3.

5. Composition according to claim 1, characterized in that said organic phosphite is selected from diphenyl 2-ethylhexyl phosphite, triphenyl phosphite, tris(2,5-di-tert.-butyl-phenyl) phosphite, tris(2-tert.butylphenyl)-phosphite, tris (2-phenylphenyl) phosphite, tris[2-(1,1-dimethylpropyl)phenyl]phosphite, tris(2-cyclohexyl-phenyl)phosphite, tris(2-tert.butyl-4-phenylphenyl)-phosphite, tris(2-tert.-butyl-4-methylphenyl) phosphite, tris(2,4-di-tert.-amylphenyl)phosphite and tris(2,4-di-tert.-butyl-phenyl)phosphite.

6. Composition according to claim 1, characterized in that said organic phosphite has a melting point higher than 100° C.

7. Process for preparing the composition according to claim 1, wherein the organic phosphite is in amorphous form, characterized in that tetrakis-[3-(3,5-di-tert.-butyl-4-hydroxyphenyl)-propionyl-oxy-methyl]methane powder and the powder of the organic phosphite are mixed with each other, the mass is molten at a temperature which typically is of the order of from 160° to 170° C., the molten mass is homogenized and the homogenized mass is then submitted to a sudden cooling down to temperature values equal to room temperature (20°-25° C.), or close to room temperature.

8. Process for preparing the composition according to claim 1, wherein the organic phosphite is in crystalline form, characterized in that tetrakis-[3-(3,5-di-tert.-butyl-4-hydroxyphenyl)-propionyl-oxy-methyl]-methane powder and the powder of the organic phosphite are mixed with each other, the mass is molten at a temperature which typically is of the order of from 160° to 170° C., the molten mass is homogenized and the homogenized mass is then submitted to a slow cooling down to a temperature of the order of 80° to 100° C., in order to cause the organic phosphite to solidify in a crystalline form, and the mass is then suddenly cooled down to temperature values equal to room temperature (20°-25° C.), or close to room temperature, in order to cause tetrakis-3-(3,5-di-tert.-butyl-4-hydroxyphenyl)-propionyl-oxy-methyl]methane to solidify in the amorphous form.

9. Process for preparing the composition according to claim 1, wherein the organic phosphite is in a crystalline form, characterized in that amorphous tetrakis-[3-(3,5-di-tert.-butyl-4 -hydroxyphenyl)-propionyl-oxy-methyl]methane is molten at a temperature of the order of 80°-100° C., the organic phosphite in the form of solid or crystalline particles is dispersed inside the molten mass and is homogenized, and the homogenized mass is then suddenly cooled down to temperature values equal to room temperature (20°-25° C.), or close to room temperature.

10. A method of stabilizing an organic polymer comprising mixing a stabilizing effective amount of the stabilizing composition of any one of claims 1-6 with said organic polymer.

11. Process for preparing the composition according to claim 7 characterized in that said dispersed phase is in the form of particles having a particle size comprised within the range of from 50 μm to 2 mm.

12. Process for preparing the composition according to claim 11, characterized in that the size of the particles of said dispersed phase is comprised within the range of from 100 to 500 μm 13. Process for preparing the composition according to claim 7 characterized in that the weight ratio of said continuous phase to said dispersed phase is comprised within the range of from 3:7 to 7:3.

14. Composition according to claim 1, characterized in that said organic phosphite is selected from bis(2,4-di-tert.-butylphenyl)pentaerythritol diphosphite, distearyl pentaerythritol diphosphite, and tetrakis(2,4-di-tert.-butylphenyl)-4,4'-biphenylene diphosphonite.

15. Process for preparing the composition according to claim 1, wherein the organic phosphite is in the amorphous form, characterized in that tetrakis-[3-(-3,5-di-tert.-butyl-4-hydroxyphenyl)-propionyl-oxy-methyl]-methane powder and the powder of the organic phosphite are mixed with each other, the mass is molten at a temperature which typically is of the order of from 160° to 170° C., the molten mass is homogenized and the homogenized mass is then submitted to a sudden cooling down to temperature values equal to room temperature (20°-25° C.), or approximately equal to room temperature.

16. Process for preparing the composition according to claim 1, wherein the organic phosphite is in a crystalline form, characterized in that tetrakis-[-3-(3,5-di-tert.-butyl-4-hydroxyphenyl)-propionyl-oxy-methyl]-methane powder and the powder of the organic phosphite are mixed with each other, the mass is molten at a temperature which typically is of the order of from 160° to 170° C., the molten mass is homogenized and the homogenized mass is then submitted to a slow cooling down to a temperature of the order of 80° to 100° C., in order to cause the organic phosphite to solidify in a crystalline form, and the mass is then further suddenly cooled down to temperature values equal to room temperature (20°-25° C.), or approximately equal to room temperature, in order to cause tetrakis-[3-(3,5-di-tert.-butyl-4-hydroxyphenyl)-propionyl-oxy-methyl]methane to solidify in the amorphous form.

17. Process for preparing the composition according to claim 1, wherein the organic phosphite is in a crystalline form, characterized in that amorphous tetrakis-[3-(3,5-di-tert.-butyl-4 -hydroxyphenyl)-propionyl-oxy-methyl]methane is molten at a temperature of the order of 80°-100° C., the organic phosphite in the form of solid or crystalline particles is dispersed inside the molten mass and is homogenized, and the homogenized mass is then suddenly cooled down to temperature values equal to room temperature (20°-25° C.), or approximately equal to room temperature.

18. Process for preparing the composition according to any one of claims 11 to 14 in the stabilization of organic polymers.

* * * * *